（12）United States Patent
Davisson et al.

(10) Patent No.: US 9,193,235 B2
(45) Date of Patent: Nov. 24, 2015

(54) STABLE HIGH-SPEED UTILITY VEHICLE (71) Applicant: NORTHERN RAILSLED LLC, Spokane Valley, WA (US)

(72) Inventors: Michael Davisson, Spokane Valley, WA (US); William Scott Denham, Truckee, CA (US)

( * ) Notice: Subject to any disclaimer, the term of this patent is extended or adjusted under 35 U.S.C. 154(b) by 0 days.

(21) Appl. No.: 14/215,505

(22) Filed: Mar. 17, 2014

(65) Prior Publication Data

US 2014/0302731 A1 Oct. 9, 2014

Related U.S. Application Data (60) Provisional application No. 61/789,876, filed on Mar. 15, 2013.

(51) Int. Cl.
*B60F 3/00* (2006.01)
*B62D 55/06* (2006.01)
*B62M 27/02* (2006.01)

(52) U.S. Cl.
CPC ............ *B60F 3/0015* (2013.01); *B60F 3/0076* (2013.01); *B62D 55/06* (2013.01); *B62M 2027/025* (2013.01); *B62M 2027/026* (2013.01)

(58) Field of Classification Search
CPC ................................. B60F 3/0015; B60F 3/00
USPC ................ 440/12.5, 12.63; 114/312
See application file for complete search history.

(56) References Cited

U.S. PATENT DOCUMENTS

| 3,063,401 | A | * | 11/1962 | Patee | 440/12.63 |
| 3,739,867 | A | * | 6/1973 | Drawe | 180/193 |
| 3,934,944 | A | * | 1/1976 | Forsgren | 305/179 |
| 4,175,627 | A | * | 11/1979 | Husted | 180/190 |
| 6,062,156 | A | * | 5/2000 | Radke et al. | 114/144 R |
| 6,540,310 | B1 | * | 4/2003 | Cartwright | 305/180 |
| 6,595,812 | B1 | * | 7/2003 | Haney | 440/11 |
| 6,921,304 | B2 | * | 7/2005 | Hewitt | 440/12.52 |
| 7,673,711 | B1 | * | 3/2010 | Berg | 180/9.21 |
| 7,712,846 | B2 | * | 5/2010 | Schindler et al. | 305/178 |
| 7,854,483 | B2 | * | 12/2010 | Bordini | 305/201 |
| 2012/0315812 | A1 | * | 12/2012 | MacDonald | 440/12.5 |
| 2013/0078877 | A1 | * | 3/2013 | Lee | 440/12.63 |
| 2014/0302731 | A1 | * | 10/2014 | Davisson et al. | 440/12.63 |

* cited by examiner

*Primary Examiner* — Lars A Olson
*Assistant Examiner* — Jovon Hayes
(74) *Attorney, Agent, or Firm* — Timberline Patent Law Group PLLC; Christopher Lattin; Mark Farrell (57) ABSTRACT

This disclosure describes a stable, high-speed utility vehicle. In an implementation, an example utility vehicle provides stable, fast transport over snow and ice. A chassis places the center of gravity of the entire vehicle low for stability during quick turns at high speed. The hull of the vehicle can float over snow or loose debris. The hull includes angular side panels that grip and grab snow when the vehicle tilts substantially to one side. The sides constitute a rail or riding surface for the vehicle to support the vehicle during sideways traverse on a steep slope. Multiple simultaneous steering mechanisms enable the vehicle to turn stably, in a tight radius, even at relatively high speeds. In an implementation, the vehicle features a 200-500 HP engine with speeds of 60 mph to transport work crews to remote utility sites.

18 Claims, 6 Drawing Sheets

STABLE HIGH-SPEED UTILITY VEHICLE

RELATED APPLICATIONS

This application claims the benefit of priority to U.S. Provisional Patent No. 61/789,876 filed Mar. 15, 2013, and incorporated herein by reference in its entirety.

FIELD OF DISCLOSURE

This disclosure relates to multi-terrain vehicles and related technologies, including those for use on non-hard or non-firm surfaces, such as snow, ice, sand, and water, and more particularly to a vehicle with multiple steering mechanisms for quick turns at high speed and a body geometry for maintaining an upright stance when sideways on hillsides and during quick turns.

BACKGROUND

Conventional all-terrain vehicles that are suitable for travel on ice and snow are generally prone to tipping-over at high speeds or sharp turns. These vehicles are generally meant for slow or moderate speeds, and gradual turns with any significant speed. Conventional vehicles that are suitable for snow or other non-hard and uneven surfaces require certain features to keep the vehicle above the snow or other non-hard surface, while at the same time providing adequate traction and control over terrain and surfaces that may frequently and dramatically vary. Thus, conventional vehicles for snow, ice, slush, mud, sand, etc., are generally built to maximize clearance between uneven ground and the bottom of the vehicle, making them somewhat top-heavy, and usually have a single turning mechanism. For example, a snowmobile, or snow machine, has a ski or set of skis that are turned by a steering mechanism, such as a steering wheel or handlebars. Some snow machines are track-driven and steer by moving tracks on each side of the cabin in different directions or at different speeds. However, no all-terrain vehicle currently exists that is suitable for tight maneuvering and safe handling at high speeds on ice and snow.

BRIEF DESCRIPTION OF THE DRAWINGS

In the following detailed description, reference is made to the accompanying schematic drawings, which form a part thereof. The use of the same symbols in different drawings typically indicates similar of identical items. The illustrative embodiments described in the detailed description, drawings, and claims are provided merely for illustration and are not meant to be limiting. Other embodiments may be utilized, and other changes may be made, without departing from the spirit or scope of the subject matter presented here.

DETAILED DESCRIPTION

Overview

This disclosure describes a stable, high-speed utility vehicle. In an implementation, an example utility vehicle provides stable, fast transport over snow and ice, including patches of semi-melted or melted snow and ice (i.e., water) and patches of solid ground. An example vehicle includes, among other components, a chassis and engine, steerable front skis, and tracks (i.e., tractor treads) for propulsion. The example vehicle differs from conventional snowcoaches, snowmobiles, etc., in several important respects that provide stability and maneuverability, enabling secure high-speed travel.

First, the chassis is built around a frame that places the center of gravity of the entire vehicle very low, and to the rear: in fact, in most embodiments the center of gravity is between the two tractor treads (hereinafter, "tracks"). The low center of gravity is possible because the vehicle is designed to float over snow, with the hull occasionally riding in the snow if necessary. The low center of gravity makes it difficult for the vehicle to flip or overturn, in any circumstance.

Second, the design of the outer chassis (hereinafter, "hull") includes angular side panels that "grip" or "grab" the snow, snow bank, or ground if the vehicle tilts substantially to one side. The sides essentially become a rail, or ski surface, or operational part of the hull on which the vehicle may intentionally ride. The sides can thus support the vehicle traveling sideways in snow on a steep slope and hold the vehicle to the side of the hill. In an implementation, the angled sides also achieve closest proximity to the ground or snow surface nearest the center of gravity, for extra stability. The hull design enables the vehicle to float over the snow or other surface. Even more importantly, the angular side panels of the frame enable the vehicle to stably travel sideways on a steep slope, where conventional snowcoaches and snowmobiles would flip on a side or tip-over.

Third, the example vehicle uses multiple simultaneous steering mechanisms to turn more stably, and with a much tighter turning radius, than conventional snow vehicles. For example, the vehicle may include steerable skis, but also differential braking (and/or differential powering) of the tracks that can separately turn the vehicle even if the skis are not steerable. When combined, the steerable skis and the differential braking of the tracks can achieve a turn of small turn radius, or a relatively tight turn even at higher speeds.

The chassis also enables mounting of a 200-500 horsepower engine, which can drive the vehicle to speeds around approximately 60 mph. The low center of gravity, the stabilizing sides of the hull, and the multiple steering systems make such fast travel over snow and ice, even on steep hills, relatively safe compared to conventional snow vehicles. The example vehicle is designed to quickly and safely carry work crews of utility companies to remote locations where utility company infrastructure needs attention, such as emergency repair. The example vehicle can also be used for emergency rescue, but utility work is contemplated as its main use, for example on large farms or ranches, or to reach remote stretches of power lines and so forth.

Example Implementations

In the following description, reference is made to the accompanying Figures, which form a part hereof. The use of the same symbols in different drawings typically indicates similar or identical items. The illustrative embodiments described in the detailed description, drawings, and claims are provided merely for illustration and are not meant to be limiting. Other embodiments may be utilized, and other changes may be made, without departing from the spirit or scope of the subject matter presented here. The drawings are exaggerated to highlight certain features; the drawings are not intended to be interpreted as being to scale.

Disclosed herein are systems, techniques, methods, and devices to enable fast movement and precision steering over a variety of terrains, particularly snow and ice, but also patches of water puddles, sand, dirt, rock, organic material, asphalt, and so forth. In an implementation, an all-terrain vehicle according to the present disclosure includes a body component that has a geometry for preventing tipovers, and for clinging to a hillside while going up the hillside crosswise. The example all-terrain vehicle has a front steering component coupled to the body component and configured to steer the front end of the all terrain vehicle, and a rear drive component coupled to the body component and configured to drive and steer a rear portion of the all-terrain vehicle by controlling movement of a plurality of endless track assemblies. A differential gearing mechanism enables independent transmission of power from an engine each endless track assembly on the left and right sides. A differential braking system enables independent braking of each of the endless track assemblies, which aids especially in the steering, by allowing the vehicle to turn on the braked track very quickly.

The example vehicle has a center of gravity that is between the endless track assemblies and lower than a top portion of the track assemblies allowing the device to climb and traverse relatively steep embankments without becoming top-heavy. The vehicle may also have extended suspension portions and an underside sled portion that allow the vehicle to traverse varying terrain with potentially heavy loads. That is, the underside of the vehicle is also a normal and expected contact surface with the ground, when the ground is uneven. The sides are also a normal and expected contact surface with the ground, for example when traversing sidewise up a steep snowy hillside.

Figure 1:
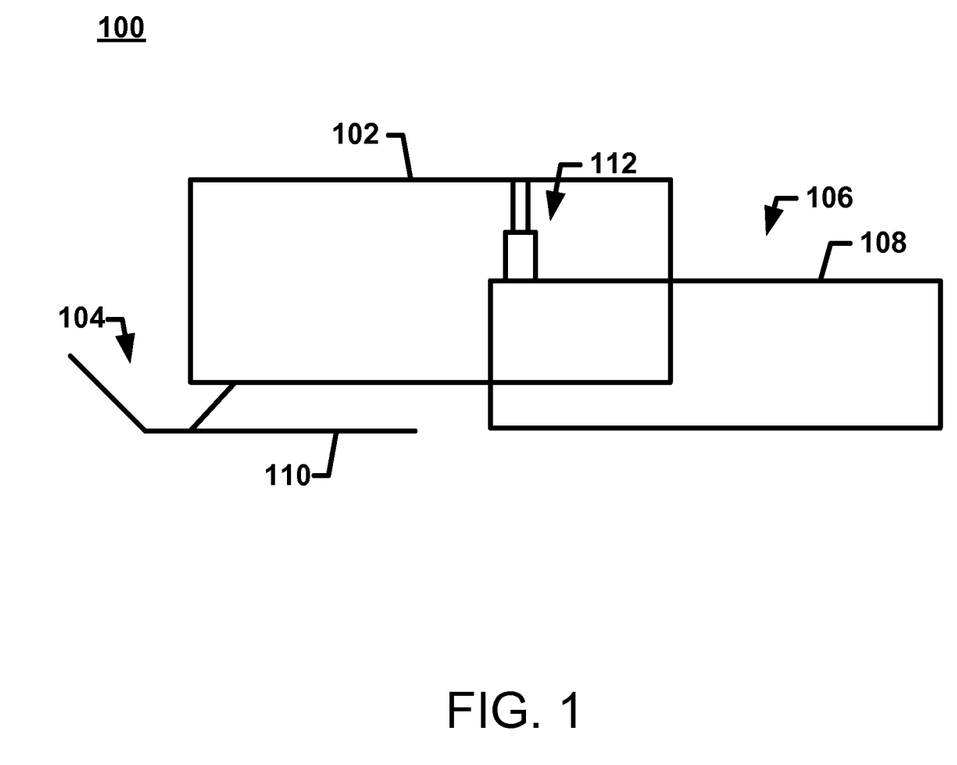
FIG. 1 is a schematic side-view diagram of basic features of an example utility vehicle configured for tight maneuvering, quick turns, and safe handling at high speeds on surfaces such as ice and snow.

FIG. 1 shows example basic components of an example all-terrain vehicle. According to an implementation, the basic systems of an example all-terrain vehicle 100 generally comprise a body component 102, a front steering component 104, and a rear drive component 106. The front steering component 104 is coupled to the body component 102 and configured to steer the front end of the all terrain vehicle 100 via skis or other contact agents (such as wheels, on some surfaces). The vehicle may have both skis and wheels available at the same time for front steering. The rear drive component 106 is coupled to the body component 102 and configured to drive and steer a rear portion of the all-terrain vehicle 100 by controlling movement of a plurality of endless track assemblies 108, for example left and right tracks. A rear suspension mechanism 112 may be coupled between the body component 102 and each of the endless track assemblies 108 to allow portions of each endless track assembly 108 to move a great distance, for example, greater than twelve inches relative to the body component 102.

Thus, an all-terrain vehicle generally comprises a body component 102, a front steering component 104, and a rear drive component 108. A chassis, frame, or other structural component is provided for mechanical stability and strength. Such a structural component may be integral with, or distinct from, the body component 102. For example, the body may comprise a tubular frame, body panels, and the like. In an implementation, the tubular frame provides strength as well as a structure on which to mount and/or integrate the front steering component 104 and the rear drive component 106.

The tubular frame may be constructed of a suitable material or combinations of materials such as steel, aluminum, titanium, molybdenum alloy, and so forth. One or more body panels may be provided to create an interior space, such as a cabin, for one or more passengers. The body panels may be transparent, translucent, or opaque and may be constructed from any suitable material or combination of materials such as steel, aluminum, fiberglass, carbon composite, wood, glass plastic, and so forth. One or more skylights, sunroofs, and/or moonroofs may be provided on an upper portion of the all-terrain vehicle to increase visibility inside and out of the cabin created by the body panels as well as to aid in reducing motion sickness that might be experienced by passengers if visibility were decreased.

Figure 2:
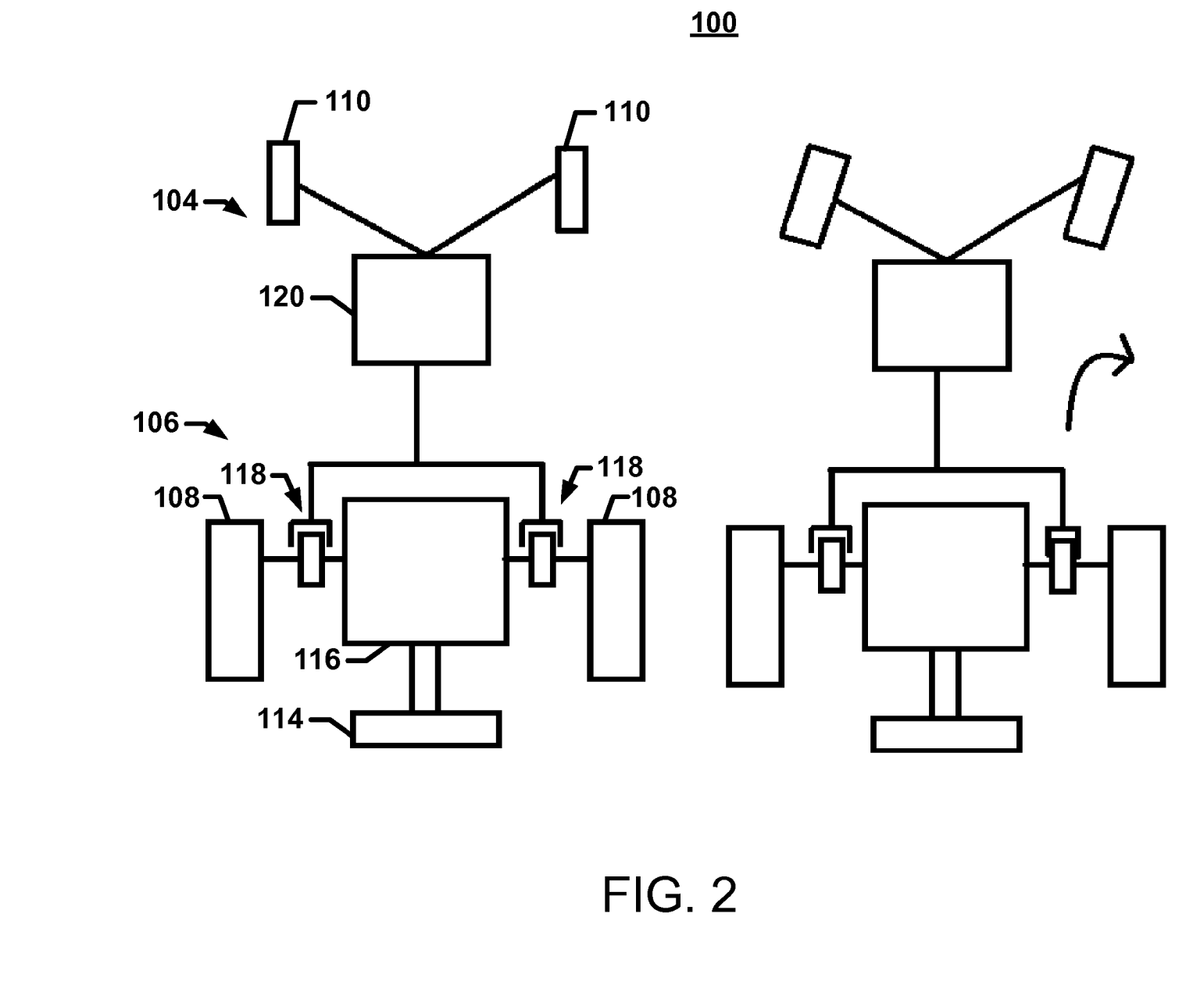
FIG. 2 is a schematic top-view diagram of multiple simultaneous steering mechanisms that may be used for turning, slowing, and stopping the example utility vehicle of FIG. 1, such as front steering, rear steering through differential power application to left and right tracks, and differential rear braking between left and right brakes.

FIG. 2 shows basic steering and drive components of the example all-terrain vehicle. As discussed with reference to FIG. 1, the all-terrain vehicle 100 is maneuvered using a first steering component 104 and a rear drive component 106. The front steering component 104 includes a system of components configured to steer the front end of the all terrain vehicle 100. The front steering component 104 may comprise at least one surface contact component 110 (skis, wheels, etc.) and at least one user engageable steering mechanism 120 coupled to the at least one surface contact component 110 to enable a user to direct the at least one surface contact component 110. For example, the user engageable steering mechanism 120 may include a steering wheel or handlebars that allow the user to turn the vehicle in one direction or another as the vehicle moves forward. The surface contact component 110 may be a ski, wheel, track, or other suitable component configurable to contact a surface such as snow, ice, asphalt, sand, water, dirt, rock, organic material, and so forth. In some example embodiments, the one or more surface contact components 110 are a pair of skis. The skis may be coupled to the body portion 102 through one or more struts and/or one or more suspension mechanism(s). The suspension mechanism may be a spring, hydraulic, or gas shock or may be a leaf-type suspension device.

The rear drive component 106 is coupled to the body component and configured to drive and steer a rear portion of the all-terrain vehicle 100 by controlling movement of a plurality of endless track assemblies. The rear drive component 106 may have a power engine 114, a differential gearing mechanism 116 coupled to the power engine 114, the differential gearing mechanism 116 configured to differentially power each of the endless track assemblies 108, a differential braking mechanism 118 coupled to selectively brake each endless track assembly 108, and a user engageable steering mechanism 120 coupled to the differential braking mechanism. According to an implementation, the user engageable steering mechanism coupled to the differential braking mechanism is integrated with the user engageable steering mechanism coupled to the front steering component. Thus, as a user turns a wheel or other mechanism to turn the front steering component, the differential braking mechanism may be engaged in order to augment the steering. This implementation enables a driver to take a single action, such as turning a steering wheel, to maneuver the vehicle.

The power engine 114 may be a conventional car, truck, or recreational vehicle engine. The power engine 114 may turn an axle that is coupled between the power engine 114 and the differential gearing mechanism 116. The differential gearing mechanism 116 directs the power from the power engine 114 to differentially power each of the two endless track assemblies 108 in a manner similar to that conventionally used in the automotive industry. The differential braking mechanism 118 is coupled between the endless track assemblies 108 and the differential gearing mechanism 116 to selectively brake each endless track assembly 108 thereby selectively decreasing or preventing power provided from the power engine 114 from reaching the endless track assemblies 108.

As mentioned above, the user engageable steering mechanism 120 is coupled to the differential braking mechanism 118. According to one implementation, the user engageable steering mechanism 120 includes at least one lever to selectively apply and release braking force to the differential braking mechanism 118. For example, a user may steer the front skis 110 using a steering wheel associated with the steering mechanism 120 while simultaneously operating two hand levers (not shown) associated with the steering mechanism 120 and coupled to the differential braking mechanism 118. Thus, for example, when a right turn is desired, the steering wheel is turned to the right and braking is applied to the right side of the differential braking mechanism 118, slowing the right side endless track assembly 108. The left side of the differential braking mechanism 118 continues at the drive speed powering the vehicle 100 through the turn. Instead of the two hand levers, foot operated braking pedals may alternatively be used. Moreover, an electronic, hydraulic, and/or mechanical system may automatically apply differential braking to the differential braking mechanism 118 in response to the steering wheel being turned. Combining the front end steering capability with differential braking allows the vehicle 100 to be maneuvered more safely and with improved handling over prior systems.

Figure 3:
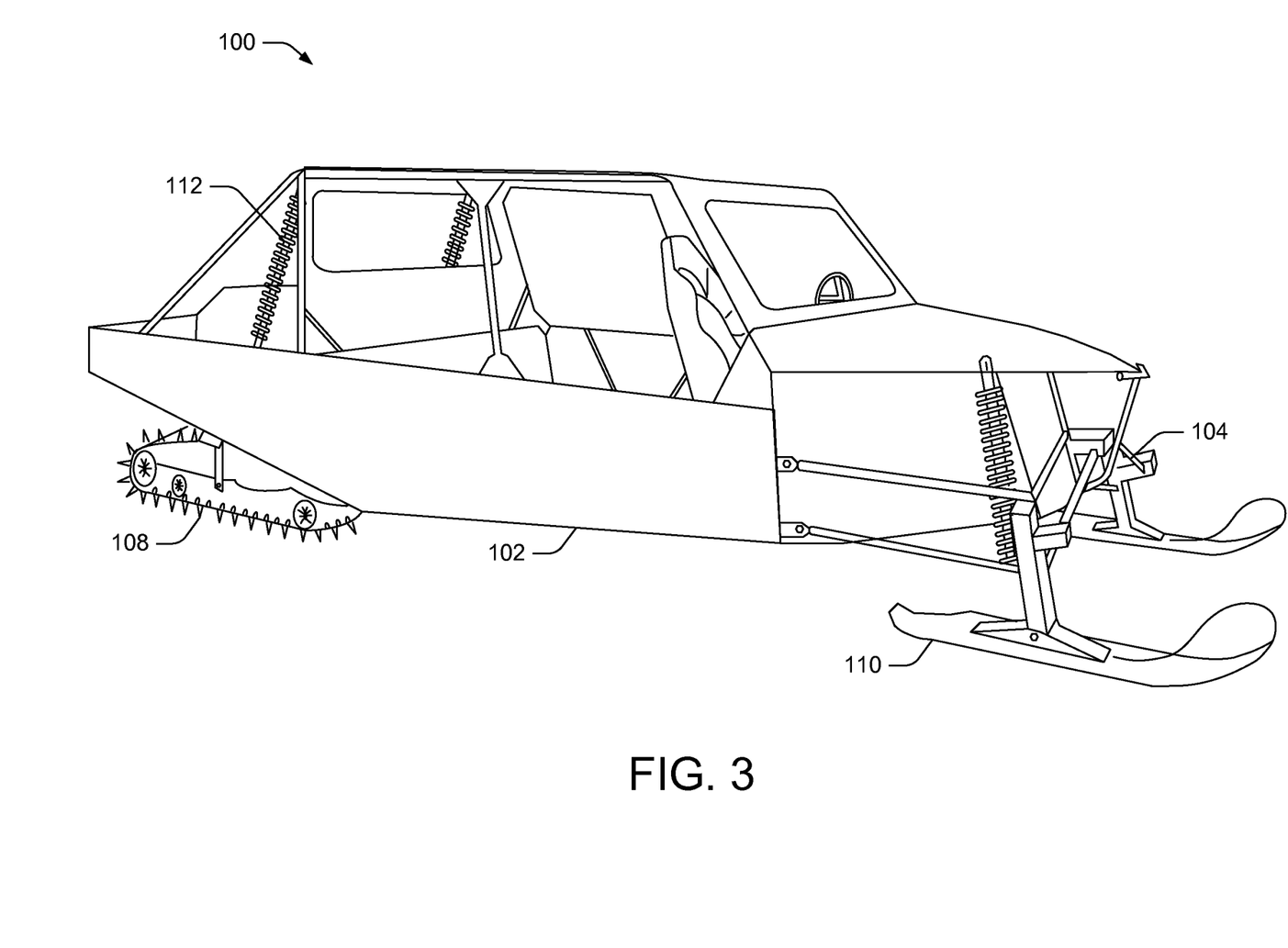
FIG. 3 is an isometric side-front view diagram an example utility vehicle.

FIG. 3 shows an isometric side view of an example all-terrain vehicle 100. In this implementation, the front contact surfaces 110 are skis. The body 102 has sides, especially a lower edge, designed to arrest a rollover and grip the ground, for example on snow and ice, when the vehicle 100 leans far enough to one side, as when situated sideways in relation to a hill. The side panels have an edge to grip or cut into the snow or ground for traction. Each edge has an angle with an apex 122 that first contacts the ground when tipping to a side. The center of gravity of the vehicle is preferably located between the apexes 122 of the angled edges of the right and left side panels.

Figure 4:
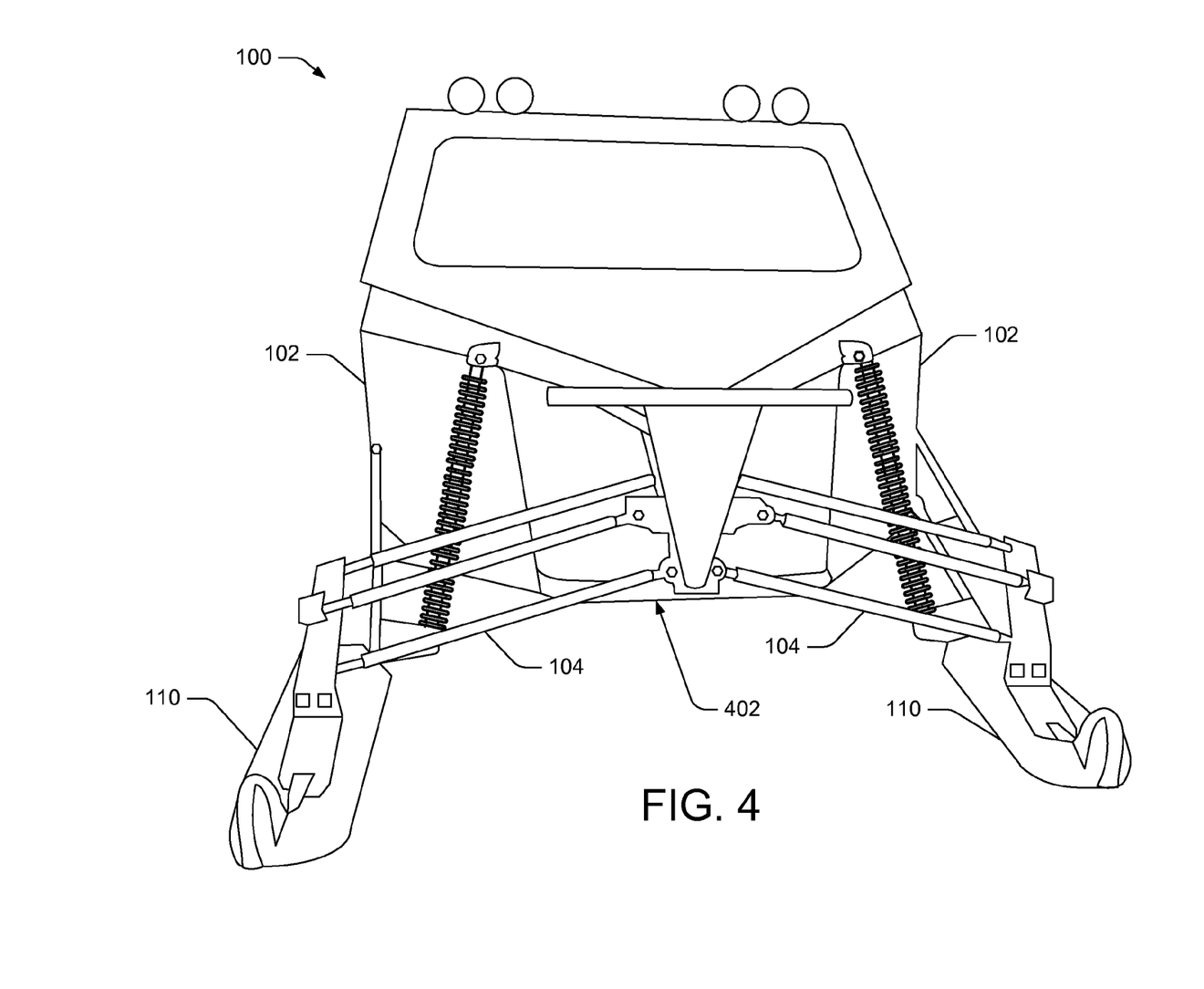
FIG. 4 is an isometric front view diagram of the example utility vehicle of FIG. 3.

FIG. 4 shows an isometric front view of the example all-terrain vehicle 100 of FIG. 3. The front steering 104 directs the contact surfaces 110 (e.g., skis and/or wheels) for steering, with suspension and shock absorber elements so that the contact surfaces 110 can be at different ground levels from each other. The underside 402 of the vehicle is a normal and expected contact surface with the ground, when the ground is uneven. In an implementation, the underside ground-contact surface of the body, or hull, is a sled surface designed for snow, ice, or ground.

Figure 5:
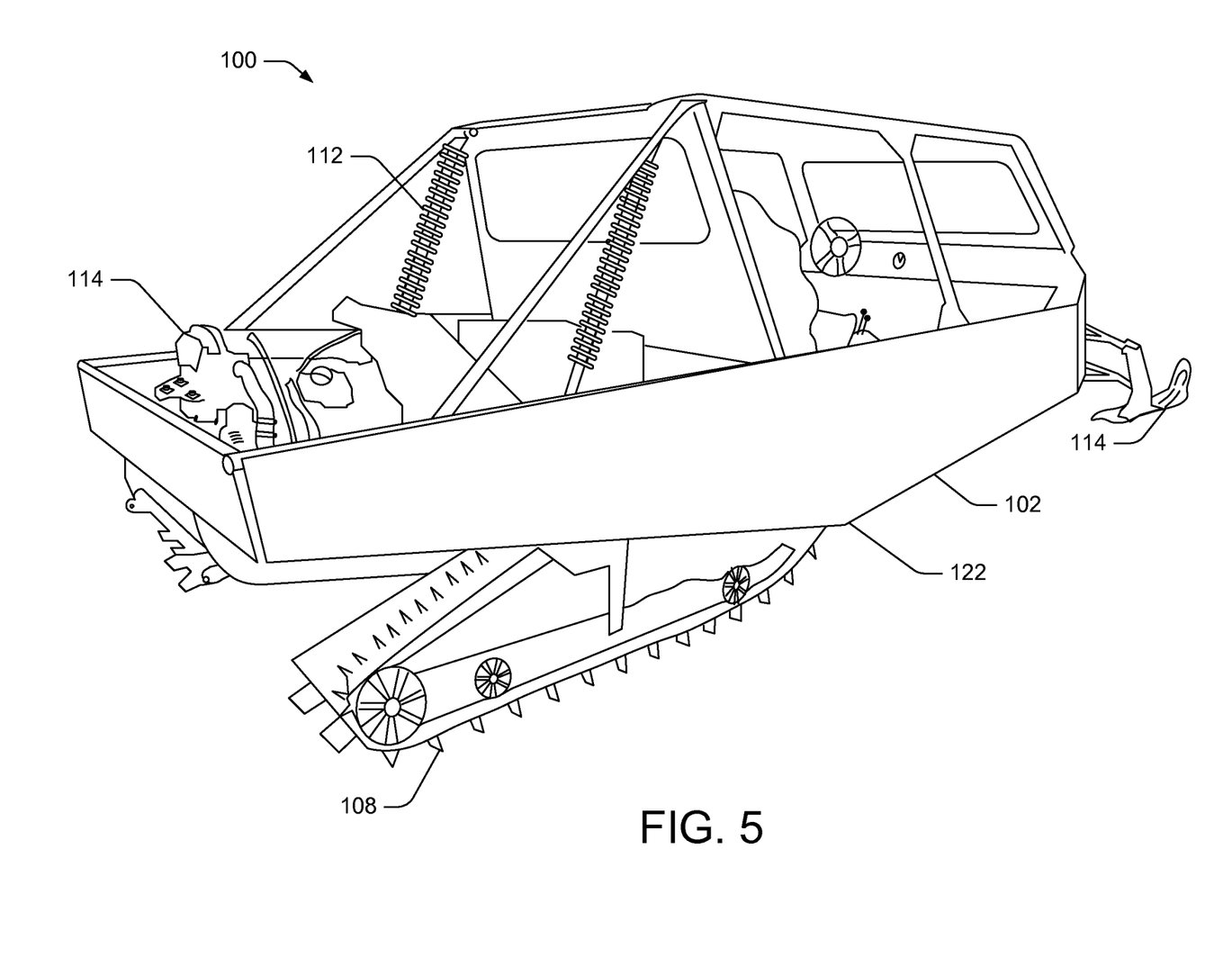
FIG. 5 is an isometric side-rear view diagram of the example utility vehicle of FIG. 3.

FIG. 5 shows an isometric side-rear view of the example all-terrain vehicle 100 of FIG. 3. The rear suspension elements 112 enable the rear tracks 108 to be at different heights from each other, with respect to uneven ground. The body 102 has sides that are normally expected contact surfaces with the ground, for example when traversing sidewise up a snowy hillside, and the vehicle 100 lists to one side. The side panels have an edge to grip or cut into the snow or ground for traction. Each edge has an angle with an apex 122 that first contacts the ground when tipping. The center of gravity of the vehicle is preferably located between the apexes 122 of the angled edges of the right and left side panels.

Figure 6:
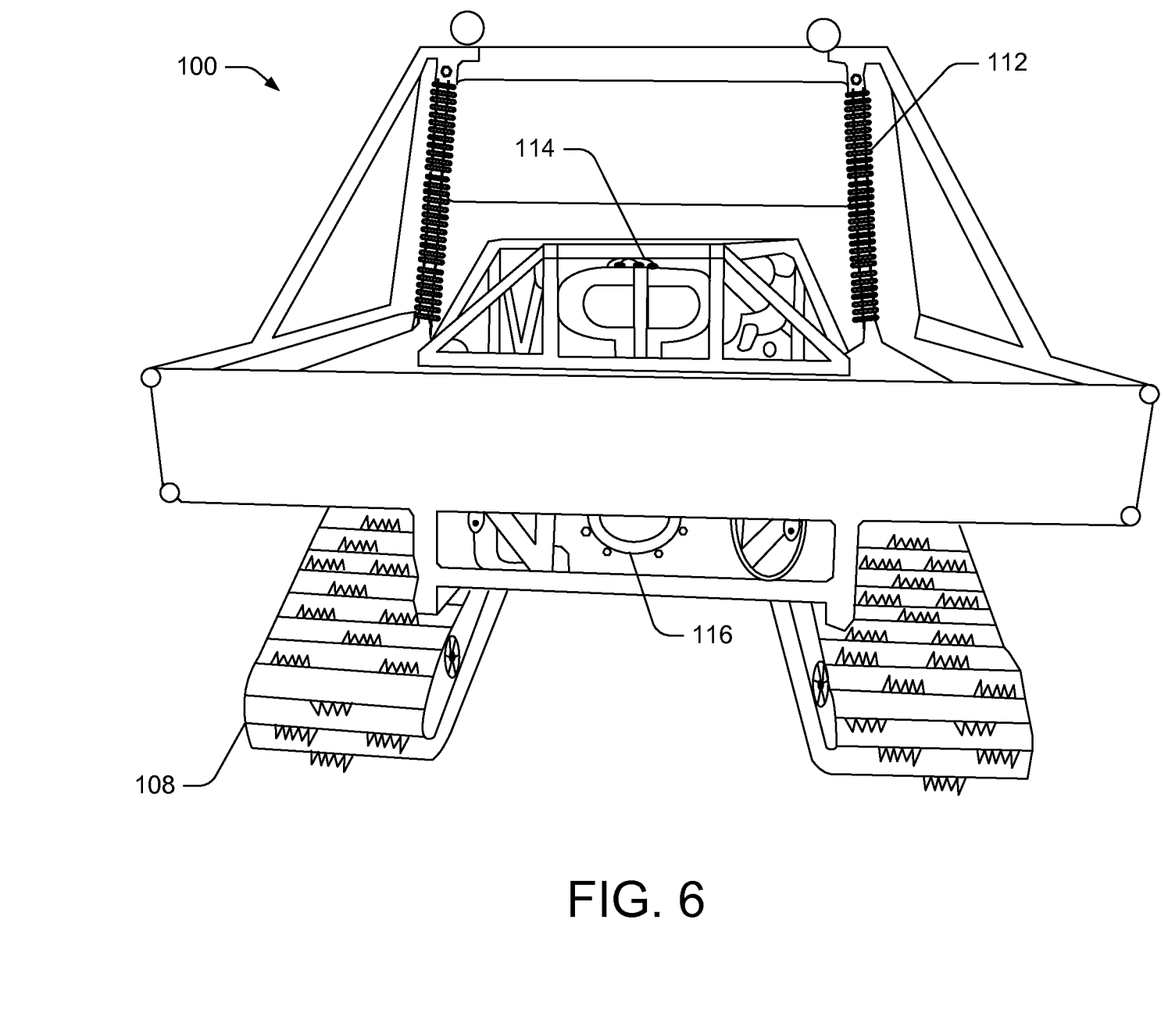
FIG. 6 is an isometric rear view diagram of the example utility vehicle of FIG. 3.

FIG. 6 shows an isometric rear view of the example all-terrain vehicle 100 of FIG. 3. A differential 116 applies power from the engine 114 to the tracks 108 individually, for steering. Differential braking 118 and the front steering 104 provide a total of three modes of controlling turns, such that the example vehicle 100 can turn very quickly and reliably, even at relatively high speeds.

According to an implementation, the center of gravity of the all-terrain vehicle 100 is between the endless track assemblies 108 and is lower than a top portion of the track assemblies 108. This configuration may be accomplished by placing one or more components associated with the power engine 114, differential gearing mechanism 116, differential braking mechanism 118 and/or other components in a suitable location on the all terrain vehicle 100 such as between the endless track assemblies 108 and at or below a top portion of the endless track assemblies 108. By placing the heaviest components of the vehicle 100 into a particular configuration such that the center of gravity is lower than a top portion of the track assemblies 108, the vehicle can traverse steeper terrain at higher speeds. In one implementation, the power engine 114 is placed between the endless track assemblies 108 so as to place the center of gravity as low as possible between the two endless track assemblies 108.

Moreover, the front-to-back axial component of the center of gravity may be sufficiently distanced from the front of the vehicle 100, i.e., toward the rear of the vehicle 100, to balance the weight when the body component 102 is loaded with passengers and/or cargo. Thus, the front end of the all-terrain vehicle 100 may be maintained to be lighter than the rear portion thereby preventing the front end of the all-terrain vehicle 100 from sinking or driving down into a loose or fluid material such as snow, sand, water, mud or the like.

A rear suspension mechanism 112 may be coupled between the body portion 102 and each of the endless track assemblies 108 to allow portions of each endless track assembly 108 to move greater than, for example, twelve inches relative to the body portion 102. In one implementation, the suspension 112 is coupled between a forward end of the endless track assembly 108 and an upper portion of the body component 102. As the vehicle 100 travels over the varying terrain, such as over steep rocky terrain covered with snow, the endless track assemblies 108 are able to maintain contact with the driving surface, thereby increasing safety and handling as well as optimizing the driving experience for the vehicle's driver and passengers.

The all terrain vehicle may further comprise an underside sled portion 402 coupled to the body portion 102 and configured to keep at least a portion of the all-terrain vehicle above loose or fluid material as the vehicle moves through the loose or fluid substance. The underside sled portion 402 may keep the vehicle above snow or may keep at least, for example, the front portion of the vehicle 100 above the non-solid surface so that the vehicle does not "dive" or submerge below the surface as the engine 114 propels the vehicle forward.

Conclusion

Undoubtedly, numerous variations and modifications of the invention will become readily apparent to those familiar with all-terrain vehicles. Although implementations of the apparatus and method have been described in language specific to structural features and/or methodological acts, it is to be understood that the system and method defined in the appended claims is not necessarily limited to the specific features or acts described. Rather, the specific features and acts are disclosed as exemplary forms of implementing the claims.

While the above detailed description has shown, described, and pointed out novel features of the invention as applied to various embodiments, it will be understood that various omissions, substitutions and changes in the form and details of the device or process illustrated may be made by those skilled in the art without departing from the spirit of the invention. The foregoing description is of the best mode presently contemplated of carrying out the invention. This description is in no way meant to be limiting, but rather should be taken as illustrative of the general principles of the invention. The scope of the invention should be determined with reference to the claims.

The invention claimed is:

1. A vehicle, comprising:
   a chassis;
   an engine attached to the chassis;
   multiple steering mechanisms, including:
   steerable front ground-contact surfaces for turning on a surface;
   left and right rear tracks differentially powered by the engine for turning the vehicle;
   left and right differential rear braking for turning the vehicle;
   a hull having at least an underside ground-contact surface for sledding along uneven ground;
   a left side panel and a right side panel of the hull positioned to support the vehicle against snow, ice, water, or a ground surface when tipping or during a sharp turn;
   a lower edge of each of the left side panel and the right side panel to grip, cut into, or gain traction from a ground surface when tipping or during a sharp turn;
   a rear drive component coupled to the body component and configured to drive and steer a rear portion of the all-terrain vehicle by controlling movement of a plurality of endless track assemblies; and
   wherein the rear drive component has a power engine, a differential gearing mechanism coupled to the power engine, the differential gearing mechanism configured to differentially power each of the tracks, a differential braking mechanism coupled to selectively brake each track, and the user engageable steering mechanism is coupled to the differential braking mechanism and the differential gearing mechanism.

2. The vehicle of claim 1, further comprising a low center of gravity to prevent tipping and rollover of the vehicle, wherein the center of gravity is located between the left and right rear tracks or between two treads.

3. The vehicle of claim 1, wherein an edge of each left side panel and each right side panel is angled with respect to a plane of the ground.

4. The vehicle of claim 3, wherein an apex of each angled edge is closest to the plane of the ground nearest the center of gravity.

5. The vehicle of claim 3, wherein each angled edge supports the vehicle to prevent flipping on a side or tipping over when the vehicle travels sideways on a slope.

6. The vehicle of claim 5, wherein one of the left side panel and the right side panel supports the vehicle in snow on a slope.

7. The vehicle of claim 1, further comprising at least one steerable ski and differential braking to turn the vehicle by braking one of the tracks.

8. The vehicle of claim 1, further comprising a steering mechanism to provide a tight turning radius.

9. The vehicle of claim 8, wherein a low center of gravity, angled sides, steerable skis, the differential braking, and differentially powered tracks enable turning at 30-50 miles per hour in a tight turning radius without tipping over the vehicle.

10. The vehicle of claim 1, wherein the underside ground-contact surface of the hull floats on a snow surface or a ground surface.

11. The vehicle of claim 10, wherein the underside ground-contact surface keeps at least a portion of the vehicle above loose material as the vehicle moves.

12. The vehicle of claim 11, further comprising extended suspension portions and an underside sled.

13. An all-terrain vehicle comprising:
    a body component;
    a front steering component coupled to the body component and configured to steer a front end portion of the all terrain vehicle;
    a rear drive component coupled to the body component and configured to drive and steer a rear portion of the all-terrain vehicle by controlling movement of a plurality of endless track assemblies; and
    wherein the rear drive component has a power engine, a differential gearing mechanism coupled to the power engine, the differential gearing mechanism configured to differentially power each of the tracks, a differential braking mechanism coupled to selectively brake each track, and the user engageable steering mechanism is coupled to the differential braking mechanism and the differential gearing mechanism.

14. The all-terrain vehicle of claim 13, wherein the front steering component comprises at least one ski and at least one user engageable steering mechanism coupled to the at least one ski to enable a user to direct the at least one ski.

15. The all-terrain vehicle of claim 13, wherein the user engageable steering mechanism is coupled to the front steering component, the differential braking mechanism, and the differential gearing mechanism, to provide a single integrated user engageable steering mechanism for the three steering mechanisms.

16. The all-terrain vehicle of claim 13, wherein the center of gravity of the all-terrain vehicle is between the endless track assemblies and lower than a top portion of the track assemblies.

17. The all-terrain vehicle of claim 13, wherein the all terrain vehicle further comprises underside sled portion coupled to the body portion and configured to keep at least a portion of the all-terrain vehicle above loose material as the vehicle moves through the loose material.

18. The all-terrain vehicle of claim 13, further comprising a rear suspension mechanism coupled between the body portion and each of the endless track assemblies to allow portions of each endless track assembly to move relative to the body portion.

* * * * *